(12) United States Patent
Marcus et al.

(10) Patent No.: US 8,523,074 B2
(45) Date of Patent: Sep. 3, 2013

(54) BAR CODE IMAGERS

(75) Inventors: Matthew S. Marcus, Plymouth, MN (US); Bernard S. Fritz, Eagan, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/219,265

(22) Filed: Aug. 26, 2011

(65) Prior Publication Data

US 2013/0048733 A1 Feb. 28, 2013

(51) Int. Cl.
*G06K 7/10* (2006.01)

(52) U.S. Cl.
USPC . 235/462.22; 235/454; 235/455; 235/462.14; 235/462.41; 235/462.42

(58) Field of Classification Search
USPC ........................ 235/462.01–472.03
See application file for complete search history.

(56) References Cited

U.S. PATENT DOCUMENTS

| | | | | |
|---|---|---|---|---|
| 4,620,237 A * | 10/1986 | Traino et al. | ................. | 358/300 |
| 5,157,243 A * | 10/1992 | Ramsey | ......................... | 235/376 |
| 5,912,451 A * | 6/1999 | Gurevich et al. | ......... | 235/462.35 |
| 5,992,749 A * | 11/1999 | Seo | ........................... | 235/472.01 |
| 6,220,514 B1* | 4/2001 | Dvorkis et al. | .......... | 235/462.37 |
| 2004/0069855 A1* | 4/2004 | Patel et al. | ............... | 235/472.01 |
| 2005/0169633 A1* | 8/2005 | Nakagawa et al. | ............. | 398/85 |
| 2006/0202036 A1* | 9/2006 | Wang et al. | ............... | 235/462.07 |
| 2006/0257634 A1* | 11/2006 | Bossert | ......................... | 428/207 |
| 2006/0278708 A1* | 12/2006 | Olmstead | ...................... | 235/454 |
| 2007/0040032 A1* | 2/2007 | Molteni | .................... | 235/462.01 |
| 2008/0179402 A1* | 7/2008 | Barkan et al. | ............ | 235/462.41 |
| 2009/0321614 A1* | 12/2009 | Drzymala | .................. | 250/208.1 |
| 2010/0033691 A1* | 2/2010 | Hung et al. | ...................... | 353/70 |
| 2010/0200658 A1* | 8/2010 | Olmstead et al. | ............. | 235/455 |
| 2011/0084143 A1* | 4/2011 | Liou | ........................ | 235/462.42 |
| 2011/0234737 A1* | 9/2011 | Gentner et al. | ............... | 347/224 |

* cited by examiner

*Primary Examiner* — Tuyen K Vo
(74) *Attorney, Agent, or Firm* — Brooks, Cameron & Huebsch, PLLC

(57) ABSTRACT

Bar code imagers and methods of operating bar code imagers are described herein. One method includes illuminating a bar code with a first illumination beam provided by the bar code imager device, wherein the first illumination beam has a first wavelength, and illuminating the bar code with a second illumination beam provided by the bar code imager device, wherein the second illumination beam has a second wavelength that is different than the first wavelength.

18 Claims, 1 Drawing Sheet

BAR CODE IMAGERS

TECHNICAL FIELD

The present disclosure relates to bar code imagers and methods of illumination used in such devices.

BACKGROUND

A bar code is a representation of data, such as, for instance, an optical machine-readable representation of data. For example, a bar code can represent data using a number of parallel lines and/or the spacing between the lines. Such a bar code can be referred to as a one-dimensional bar code.

As an additional example, a bar code can represent data using a number of geometrical shapes and or patterns, such as, for instance, squares, dots, and/or hexagons, among other geometrical shapes and/or patterns. Such a bar code can be referred to as a two-dimensional bar code.

A bar code can be used to represent data associated with a product or products, among other uses. For example, a bar code representing data associated with a product(s) can be placed on the product(s) (e.g., on the packaging of the product(s) or on the container containing the product(s)).

A bar code imager can be used to create an image of (e.g., read) a bar code. The bar code imager can create the image of the bar code by, for example, illuminating the bar code in the case of a low ambient light environment. The image of the bar code can then be used to determine (e.g., read) the data represented by the bar code.

Some previous bar code imagers may be able to create a high resolution image of a bar code that is located a long distance from the bar code imager. However, such previous long range, high resolution bar code imagers had large form factors (e.g., large physical sizes and/or dimensions). That is, such previous long range, high resolution bar code imagers were not compact bar code imagers, and therefore could not be readily positioned or moved to a proper imaging location.

DETAILED DESCRIPTION

Bar code imagers and methods of operating bar code imagers are described herein. For example, one or more embodiments include illuminating a bar code with a first illumination beam provided by the bar code imager device, wherein the first illumination beam has a first wavelength, and illuminating the bar code with a second illumination beam provided by the bar code imager device, wherein the second illumination beam has a second wavelength that is different than the first wavelength.

Bar code imagers in accordance with one or more embodiments of the present disclosure can be long range, high resolution bar code imagers having reduced form factors (e.g., reduced physical sizes and/or dimensions) as compared to previous long range, high resolution bar code imagers. That is, bar code imagers in accordance with one or more embodiments of the present disclosure may be compact bar code imagers as compared to previous long range, high resolution bar code imagers.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of lasers" can refer to one or more lasers.

Figure 1:
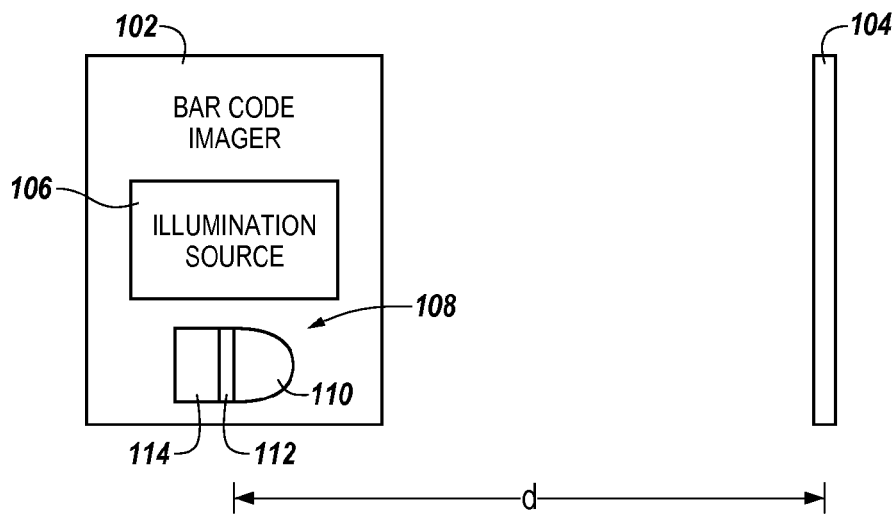
FIG. 1 illustrates a side view of a portion of a bar code imager in accordance with one or more embodiments of the present disclosure.

FIG. 1 illustrates a side view of a portion of a bar code imager 102 in accordance with one or more embodiments of the present disclosure. Bar code imager 102 can be used to create an image of a bar code such as, for instance, bar code 104 illustrated in FIG. 1. Bar code 104 can be, for example, a one-dimensional or two-dimensional bar code.

Bar code imager 102 can be a long range and/or high resolution bar code imager. That is, bar code imager 102 can create an image of (e.g., read) a bar code (e.g., bar code 104) that is located a long distance from bar code imager 102, and/or bar code imager 102 can create a high resolution image of a bar code.

For example, bar code 104 can be located a distance d from bar code imager 102, as illustrated in FIG. 1, and distance d can be, for instance, at least 10 meters. As an additional example, bar code imager 102 can have a resolution of approximately 5 mils. As such, bar code imager 102 can have a reduced form factor (e.g., reduced physical size and/or dimensions) as compared to previous long range, high resolution bar code imagers, as previously described herein.

However, embodiments of the present disclosure are not limited to a particular distance between bar code imager 102 and bar code 104, or to a particular resolution for bar code imager 102. For example, bar code imager 102 may also be used for short range applications (e.g., to create an image of a bar code that is located a short distance from bar code imager 102).

As shown in FIG. 1, bar code imager 102 includes an illumination source 106. Illumination source 106 can include, for example, an array (e.g., a seven-by-seven array) of fixed (e.g., non-movable) lasers, or a number of (e.g., three) movable lasers, which can reduce the form factor of bar code imager 102. However, embodiments of the present disclosure are not limited to a particular type or number of lasers.

Illumination source 106 can provide a plurality of (e.g., at least two) illumination beams for illuminating bar code 104. The illumination beams can be, for example, beams of light such as, for instance, laser beams, as will be further described herein. However, embodiments of the present disclosure are not limited to a particular type of illumination beam.

Illumination source 106 can provide each of the plurality of illumination beams (e.g., illumination source 106 can illuminate bar code 104 with each of the plurality of illumination beams) at the same time (e.g., concurrently) or at different times (e.g., consecutively and/or sequentially), as will be further described herein.

Each of the plurality of illumination beams can have a different wavelength and/or a different modulation (e.g., intensity) frequency, which can reduce the form factor of bar code imager 102. That is, a first of the plurality of illumination beams can have a first wavelength and/or a first modulation frequency, a second of the plurality of illumination beams can have a second wavelength that is different than the first wavelength and/or a second modulation frequency that is different than the first modulation frequency, a third of the plurality of illumination beams can have a third wavelength that is different than the first and second wavelengths and/or a third modulation frequency that is different than the first and second modulation frequencies, etc.

In some embodiments, the illumination beams can be circular laser beams that illuminate a circular portion of bar code 104. The diameter of the circular laser beams can be, for example, approximately half of the resolution of bar code imager 102, which can reduce the form factor of bar code imager 102. However, embodiments of the present disclosure are not limited to a particular diameter or shape for the illumination beams.

In some embodiments (e.g., embodiments in which illumination source 106 includes a number of movable lasers), each of the plurality of illumination beams can be scanned (e.g., rastered) horizontally (e.g., from left to right) across bar code 104. For example, a single movable laser of illumination source 106 can illuminate bar code 104 with each of the plurality of illumination beams by scanning each of the plurality of illumination beams horizontally across bar code 104 at different times (e.g., consecutively and/or sequentially).

That is, the single movable laser can scan a first illumination beam having a first wavelength and/or a first modulation frequency horizontally across bar code 104, then scan a second illumination beam having a second wavelength that is different than the first wavelength and/or a second modulation frequency that is different than the first modulation frequency horizontally across bar code 104 after scanning the first illumination beam horizontally across bar code 104, then scan a third illumination beam having a third wavelength that is different than the first and second wavelengths and/or a third modulation frequency that is different than the first and second modulation frequencies horizontally across bar code 104 after scanning the first and second illumination beams horizontally across bar code 104, etc.

In some embodiments (e.g., embodiments in which bar code 104 is a one-dimensional bar code), each of the plurality of illumination beams can be scanned horizontally across the same horizontal portion of bar code 104. In some embodiments (e.g., embodiments in which bar code 104 is a two-dimensional bar code), different illumination beams can be scanned horizontally across different horizontal portions of bar code 104.

In some embodiments (e.g., embodiments in which illumination source 106 includes an array of fixed lasers), each of the plurality of illumination beams can illuminate a different portion of bar code 104. For example, the array of fixed lasers of illumination source 106 can illuminate different portions of bar code 104 with different illumination beams at the same time (e.g., concurrently).

For instance, the array of fixed lasers can concurrently illuminate a first portion of bar code 104 with a first illumination beam having a first wavelength and/or a first modulation frequency, a second portion of bar code 104 that is different than the first portion with a second illumination beam having a second wavelength that is different than the first wavelength and/or a second modulation frequency that is different than the first modulation frequency, a third portion of bar code 104 that is different than the first and second portions with a third illumination beam having a third wavelength that is different than the first and second wavelengths and/or a third modulation frequency that is different than the first and second modulation frequencies, etc.

As an additional example, the array of fixed lasers can concurrently illuminate different portions of bar code 104 with different illumination beams each having a first wavelength and/or a first modulation frequency, than subsequently concurrently illuminate the different portions of bar code 104 with different illumination beams each having a second wavelength that is different than the first wavelength and/or a second modulation frequency that is different than the first modulation frequency, than subsequently concurrently illuminate the different portions of bar code 104 with different illumination beams each having a third wavelength that is different than the first and second wavelengths and/or a third modulation frequency that is different than the first and second modulation frequencies, etc.

As shown in FIG. 1, bar code imager 102 includes a light concentrator 108. Light concentrator 108 can include a light collector 110, as illustrated in FIG. 1. Light collector 110 can collect light that reflects (e.g., scatters) off bar code 104 after bar code 104 is illuminated by the plurality of illumination beams.

That is, light collector 110 can collect light that reflects off bar code 104 after bar code 104 is illuminated by a first illumination beam having a first wavelength and/or a first modulation frequency, light that reflects off bar code 104 after bar code 104 is illuminated by a second illumination beam having a second wavelength that is different than the first wavelength and/or a second modulation frequency that is different than the first modulation frequency, light that reflects off bar code 104 after bar code 104 is illuminated by a third illumination beam having a third wavelength that is different than the first and second wavelengths and/or a third modulation frequency that is different than the first and second modulation frequencies, etc.

As shown in FIG. 1, light concentrator 108 can include a filter 112 through which the light collected by light collector 110 (e.g., the light that reflects off bar code 104 after bar code 104 is illuminated by the plurality of illumination beams) can pass (e.g., be filtered). Filter 112 can be, for example, a color filter. However, embodiments of the present disclosure are not limited to a particular type of filter.

As shown in FIG. 1, light concentrator 108 can include a light detector 114. Light detector 114 can include, for example, a single high gain light detector, such as an avalanche photodiode (APD) or photomultiplier tube (PMT) detector, among other types of light detectors.

In some embodiments (e.g., embodiments in which the plurality of illumination beams have a different wavelength and a different modulation frequency), light detector 114 can include a plurality of light detectors, such as, for example, an array of light detectors. However, embodiments of the present disclosure are not limited to a particular type or number of light detectors.

Light detector 114 can convert the light collected by light collector 110 (e.g., after the light passes through filter 112) into a readable electronic signal that represents an image of bar code 104 (e.g., that can be reconstructed into an image of bar code 104). The different light that reflects off bar code 104 after bar code 104 is illuminated by the different illumination beams can be distinguished on the signal by performing a wavelength filtering frequency analysis such as, for example, a Fourier transform.

For instance, the light that reflects off bar code 104 after bar code 104 is illuminated by a first illumination beam can be distinguished from the light that reflects off bar code 104 after bar code 104 is illuminated by a second illumination beam by performing a wavelength filtering frequency analysis. Additionally, in instances in which a faint amount of light reflects off bar code 104 after bar code 104 is illuminated by the plurality of illumination beams, signal recovery techniques, such as, for instance, small bandwidth lock-in, can be used to detect the light.

Figure 2:
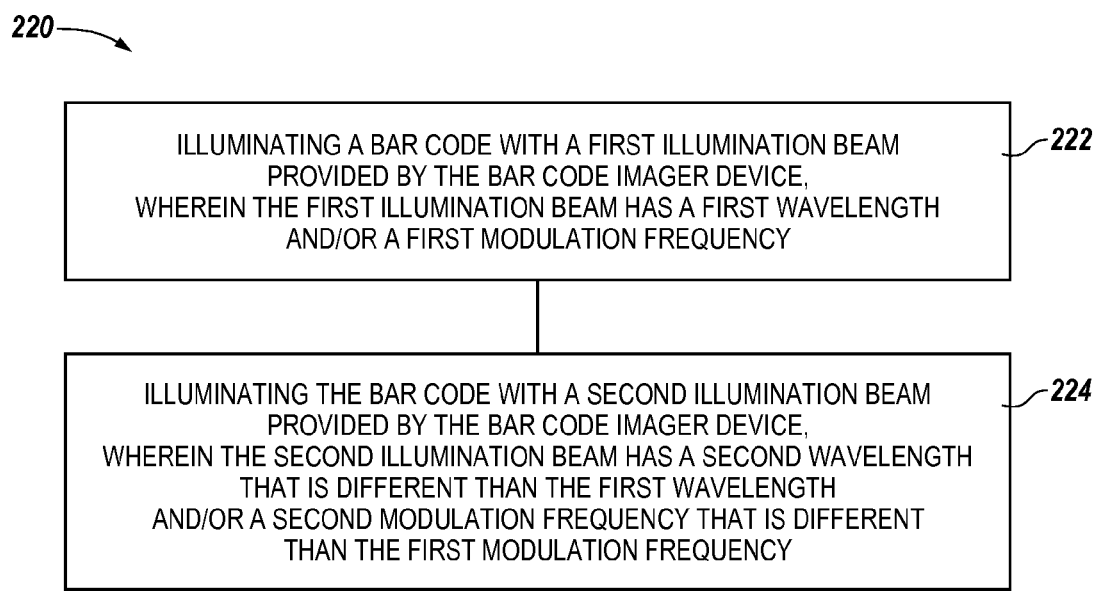
FIG. 2 illustrates a method of operating a bar code imager in accordance with one or more embodiments of the present disclosure.

FIG. 2 illustrates a method 220 of operating a bar code imager in accordance with one or more embodiments of the present disclosure. The bar code imager can be, for example, bar code imager 102 previously described in connection with FIG. 1.

At block 222, method 220 includes illuminating a bar code with a first illumination beam provided by the bar code imager device (e.g., bar code imager 102), wherein the first illumination beam has a first wavelength and/or a first modulation (e.g., intensity) frequency. The bar code can be, for example, bar code 104 previously described in connection with FIG. 1. The first illumination beam can be, for example, a first illumination beam of the plurality of illumination beams previously described in connection with FIG. 1, and can be provided by the bar code imager device in a manner analogous to that previously described in connection with FIG. 1.

At block 224, method 220 includes illuminating the bar code with a second illumination beam provided by the bar code imager device, wherein the second illumination beam has a second wavelength that is different than the first wavelength and/or a second modulation frequency that is different than the first modulation frequency. The second illumination beam can be, for example, a second illumination beam of the plurality of illumination beams previously described in connection with FIG. 1, and can be provided by the bar code imager device in a manner analogous to that previously described in connection with FIG. 1.

In some embodiments, method 220 can include collecting, by the bar code imager device, light that reflects (e.g., scatters) off the bar code after the bar code is illuminated by the first and second illumination beams. The bar code imager can collect the light that reflects off the bar code in a manner analogous to that previously described in connection with FIG. 1.

In some embodiments, method 220 can include converting, by the bar code imager device, the light collected by the bar code imager device into a readable electronic signal that represents an image of the bar code (e.g., an electronic signal that can be reconstructed into an image of the bar code). The bar code imager can convert the collected light into the electronic signal in a manner analogous to that previously described in connection with FIG. 1.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of operating a bar code imager device, comprising:
   illuminating a bar code with a first illumination beam provided by a single illumination source of the bar code imager device, wherein the first illumination beam has a first wavelength and illuminating the bar code with the first illumination beam includes moving the first illumination beam across the bar code from a first side of the bar code to a second side of the bar code; and
   illuminating the bar code with a second illumination beam provided by the single illumination source of the bar code imager device, wherein the second illumination beam has a second wavelength that is different than the first wavelength and illuminating the bar code with the second illumination beam includes moving the second illumination beam across the bar code from the first side of the bar code to the second side of the bar code at a different time than the first illumination beam.

2. The method of claim 1, wherein:
   the first illumination beam has a first modulation frequency; and
   the second illumination beam has a second modulation frequency that is different than the first modulation frequency.

3. The method of claim 1, wherein the method includes illuminating the bar code with a number of additional illumination beams provided by the single illumination source of the bar code imager device, wherein each of the additional illumination beams has a different wavelength and/or a different modulation frequency.

4. The method of claim 1, wherein the method includes:
   collecting, by the bar code imager device, light that reflects off the bar code after the bar code is illuminated by the first illumination beam; and
   collecting, by the bar code imager device, light that reflects off the bar code after the bar code is illuminated by the second illumination beam.

5. The method of claim 4, wherein the method includes distinguishing the light that reflects off the bar code after the bar code is illuminated by the first illumination beam from the light that reflects off the bar code after the bar code is illuminated by the second illumination beam by performing a wavelength filtering frequency analysis.

6. The method of claim 1, wherein the first illumination beam and the second illumination beam are circular laser beams that illuminate a circular portion of the bar code.

7. The method of claim 6, wherein a diameter of the first and second illumination beams is approximately half of a resolution of the bar code imager device.

8. A method of operating a bar code imager device, comprising:
   illuminating a bar code with a plurality of illumination beams provided by a single illumination source of the bar code imager device, wherein illuminating the bar code with the plurality of illumination beams includes moving each of the plurality of illumination beams across the bar code from a first side of the bar code to a second side of the bar code at different times;
   wherein each of the plurality of illumination beams has a different modulation frequency.

9. The method of claim 8, wherein each of the plurality of illumination beams has a different wavelength.

10. The method of claim 8, wherein each of the plurality of illumination beams illuminates a different portion of the bar code.

11. The method of claim 8, wherein the bar code is located at least 10 meters from the bar code imager device.

12. A bar code imager device, comprising:
   a single illumination source configured to provide a plurality of illumination beams for illuminating a bar code by moving each of the plurality of illumination beams across the bar code from a first side of the bar code to a second side of the bar code at different times;
   wherein each of the plurality of illumination beams has a different wavelength and a different modulation frequency.

13. The device of claim 12, wherein the single illumination source includes a movable laser.

14. The device of claim 12, wherein the bar code imager device has a resolution of approximately 5 mils.

15. The device of claim 12, wherein the bar code imager device includes a light concentrator configured to collect light that reflects off the bar code after the bar code is illuminated by the plurality of illumination beams.

16. The device of claim 15, wherein the light concentrator includes a light collector configured to collect the light that reflects off the bar code after the bar code is illuminated by the plurality of illumination beams.

17. The device of claim 15, wherein the light concentrator includes a light detector configured to convert the collected light into an electronic signal that represents an image of the bar code.

18. The device of claim 17, wherein the light detector includes a single light detector or an array of light detectors.

* * * * *